Aug. 18, 1953  C. C. HUTCHINS  2,649,561
ELECTRIC MOTOR
Filed Dec. 2, 1948  2 Sheets-Sheet 1

INVENTOR.
CHARLES C. HUTCHINS
BY
ATTORNEYS

Aug. 18, 1953  C. C. HUTCHINS  2,649,561
ELECTRIC MOTOR

Filed Dec. 2, 1948  2 Sheets-Sheet 2

INVENTOR.
CHARLES C. HUTCHINS
BY
ATTORNEYS

Patented Aug. 18, 1953

2,649,561

UNITED STATES PATENT OFFICE 2,649,561

ELECTRIC MOTOR

Charles C. Hutchins, Ridgway, Pa., assignor to Hutchins Electric Company, Inc., Ridgway, Pa., a corporation of Pennsylvania Application December 2, 1948, Serial No. 63,116

8 Claims. (Cl. 318—220)

This invention relates to electric motors and more specifically to alternating current motors of the single phase variety.

Heretofore it has been the practice to provide single phase motors with commutators and armature windings for starting purposes, or to utilize some other means to accomplish starting. One type of means employed for starting induction motors is commonly referred to as a pole shading coil whereby one portion of each pole is wrapped with a copper strip forming a closed circuit. This shading coil acts to delay the flux passing through it so that the flux lags behind that in the unshaded part. The combined action gives a sweeping action magnetically across the face of the pole resulting in more or less of a revolving flux. This supplies the starting torque. However, "shaded pole" motors are usually limited to horse power ratings from 1/200 to 1/20.

Another starting method of this general type consists of using unequal air gaps under the pole halves to produce a somewhat similar change in reluctance. The torques so available, while rather light, do exist and some such machines are in commercial production. While several other methods for accomplishing the result of pole shading have been advanced, none have found commercial acceptance due to their having critical inherent limitations.

Another means employed for starting induction motors is the so-called split-phase winding comprising a main running winding and a second stator winding generally displaced in space by 90 electrical degrees from the running winding. Such motors are designed so that the current in the two windings are out of phase and supply fluxes displaced in space and time so as to yield a motor torque on starting. Continued operation on both windings results in overheating or inefficient performance, therefore, the usual design calls for a centrifugal switch on the motor to disconnect the starting winding at about 70% synchronous speed. The reason for this is that when such a motor is up to speed there is a difference in phase between the counter voltages of the rotor as reflected into each winding and the resulting voltage difference forces current to circulate, causing not only excess heating but unbalance and noise. Therefore, burn-outs frequently occur in this type of motor following a failure in operation of the centrifugal switch mechanism.

Another method for starting is employed in the "capacitor motors" which are similar to split phase motors usually having squirrel cage rotor windings and two stator windings mechanically displaced, one of which is connected in series with a capacitor employed for the purpose of displacing a current between the two windings. This arrangement also results in a displaced flux pattern which provides a starting torque. The condenser may or may not be disconnected when the motor reaches normal operating speed. In the event the capacitor is disconnected, switching means are required, and if the capacitor is not disconnected, the selection of the type of capacitor becomes critical.

There is also employed a type of motor known as repulsion-start, induction-run motor. These motors have wound rotors and commutators. Upon coming up to speed, a centrifugal mechanism causes the commutator bars to be short-circuited after which the armature acts as an ordinary squirrel cage rotor. In some cases, the same mechanism is used to lift the brushes to reduce brush noise and wear during operation.

It is the object of this invention to provide a single phase self-starting induction motor in which no commutators are required and which will operate without the use of sliding contacts such as those usually represented by slip ring assemblies, centrifugal mechanisms or external phase displacing means.

It is well known that the simple single phase induction motor can develop no starting torque whatever but if such a machine is given an impulse in one direction or the other it will accelerate to operating speed and operate in most respects in an entirely similar fashion to a polyphase machine. The physical concepts offered to explain this action, however, have heretofore been somewhat confused and the usual expedient is to adopt the device of considering the effective superpositioning of two fields so as to be either approximately at right angles to each other as in the so-called "cross field" theory or to be revolving in opposite directions without interference to each other as in the so-called "revolving field theory." As a result of these applications the subject has been considered so complex in nature that motors capable of providing self-starting features have been generally limited to those hereinbefore reviewed.

As a result of extended researches into the theory of operation of single phase motors I have discovered simple and practical means for providing a single phase motor structure of a type making the machine inherently self-starting with torque values generally comparable to those obtained in existing polyphase machines.

It is a further object of this invention to provide a motor structure which is sufficiently simple so as to be of great economic value and, as will be seen, makes possible a provision of a most desirable form of motor at the very minimum cost.

These and other objects of the invention particularly relating to details of construction and operation will become apparent from the following description read in conjunction with the accompanying drawings, in which.

It is well understood that the operating characteristics of the polyphase motor depend upon the proper allocation of the relationships between certain fundamental factors such as primary resistance, primary leakage reactance, secondary resistance and secondary leakage reactance with the secondry characteristics related to those of the primary through the magnetic linkages existing between them. This magnetic linkage is often referred to as the "mutual reactance."

In like fashion the operation of a single phase machine depends absolutely upon a similar proper interrelationship of these same factors. It is necessary, however, to divide the motor primary windings into two or more circuits and space these circuits or elements of the winding on the motor core with respect to each other so as to take advantage of the proper balance of the above mentiond factors.

Figure 1:
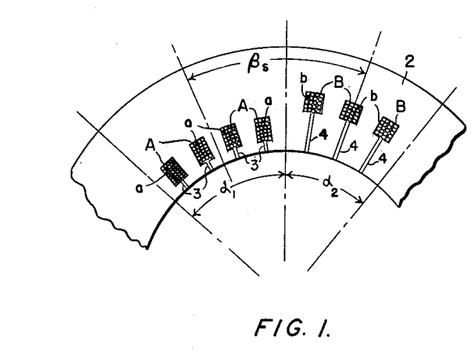
Figure 1 is a fragmentary sectional view of a motor stator showing the relative positions of the coil windings and the slotting arrangements for one pole of a two pole motor.

In carrying out this invention at least two styles of primary slots are essential in effecting the desired circuit balance. In Figure 1 is shown one pole of a two pole motor stator 2 containing slots A and B in which are located winding bands $a$ and $b$ respectively.

The slots A containing the winding band $a$ are shallow comparatively low leakage reactance style slots in number suitable to contain the windings $a$ and distributed over an arc of the pole face $a_1$. The arc $a_1$ may be of any convenient extent depending upon the relative proportions of the elements but preferably will not be greater than 90 electrical degrees in the average machine and usually it will be less. For illustrative purposes one pole of a two pole winding is shown in Figure 1. However, any number of pairs of poles may be established by repetition and variation of the arrangement as will become hereinafter apparent.

The slots B are high leakage reactance slots containing winding band $b$. As illustrated these slots are set well down in the core of the stator as shown by the length of the slits 4 forming deep tooth tips as compared to the length of the slits 3 associated with the slots A which form shallow tooth tips, and high leakage reactance is obtained by making the slit narrow, or completely closing the slit as in the case of slots 6 or by filling the slit as shown in slots 8 with bundles of steel wires or steel strips 10. As heretofore it has been considered undesirable to use slots of high leakage reactance in motor primaries this feature represents an extreme departure from normal practice and represents an important element in the present invention. These slots B with their accompanying band of winding extend over the arc $a_2$ of the pole face. This arc may be of any convenient extent depending upon the design, and while preferably it will not be greater than 90 electrical degrees, it may be greater or less than this if desired. The two arcs $a_1$ and $a_2$ may overlap if desired in which event at least a portion of some of the slots B will be located beneath slots A.

It will be evident that the arrangement may be carried out in various ways; however, the essential to be provided resides in the provision of greater leakage reactance in the winding band of slots B as compared to the leakage reactance of the winding band of slots A. The primary space angle $\beta_3$ the distance in electrical degrees between the center lines of winding bands $a$ and $b$ may be 90 electrical degrees, but depending upon the values of $a_1$ and $a_2$ and the overlap of slots A and B will be a greater or lesser angle selected to be favorable for starting purposes and construction convenience.

In carrying out the details of the invention it is not necessary to use a sine distribution for the windings. Sine distributions are generally used in single phase machines because of the prevailing idea that noise in operation is caused by harmonics or multiple fields. A pure sine distribution would contain no harmonics or multiples, therefore a near approach would silence an otherwise noisy motor. The winding distribution as shown in the present specification results in a breaking up effect of possible multiple fields. This freedom from strict adherence to the conventional sine distribution allows the use of punchings over a wider range and considerably simplifies the problems of winding distribution from the standpoint of both manufacturing and design, with a resultant reduction in cost.

Figure 3:
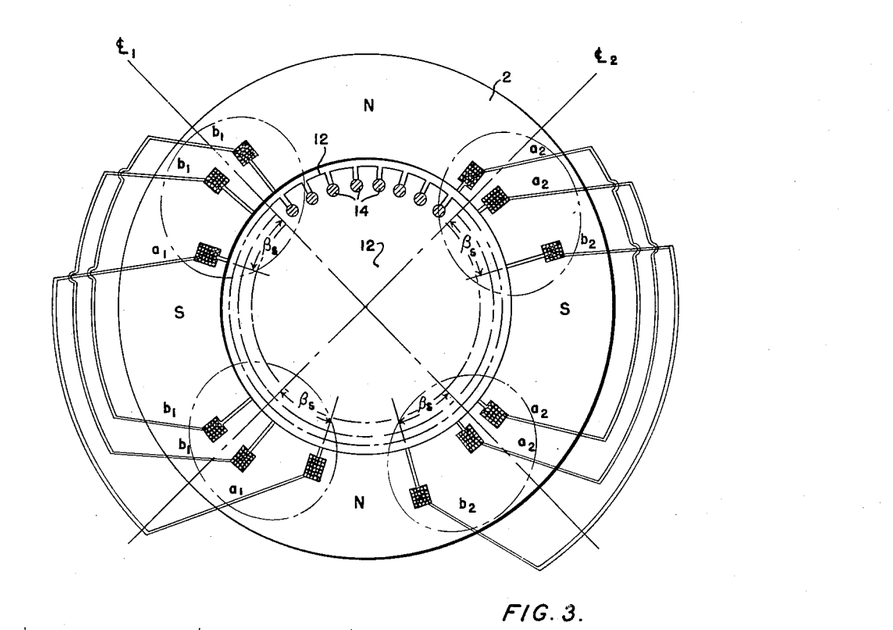
Figure 3 is a sectional view of a four pole motor stator showing one possible arrangement of coil slots.

It is sometimes desirable for design purposes, as is hereinafter made clear, that the winding of band $b$ consists of fewer conductors than the winding of band $a$, while at the same time the arrangement of the slotting is such that the leakage reactance of the winding in slots B is greater than the leakage reactance of the winding in slots A. In addition, the winding of band $b$ is to have lower resistance than the winding of band $a$. Those skilled in the art will recognize that the fewer turns of the winding of band $b$ when used provide a higher inverse value of transformer ratio with the rotor for this winding than the similar ratio for the winding of the band $a$, thus the relative magnitudes of the countervoltages in the two windings may be adjusted by varying the number of turns of the windings. While, as previously stated, it is sometimes desirable that the winding band $b$ have fewer conductors than the winding band $a$, by proper selection of the position or spacing of the $a_1$ and $b_2$ windings relative to the polar reference center lines as indicated in Figure 3 the winding band $b$ may be made with a greater number of turns of conductors than the winding band $a$ and still provide balanced internal voltages, as will be hereinafter described, substantially eliminating circulating currents within the windings during normal running operation of the motor.

To provide the most favorable motor the winding $a$ is laid out first and proportioned to have the lowest value of leakage reactance readily obtainable and compatible with the machine proportions selected. This winding $a$ is proportioned to have a value of resistance such that when carrying loads at full speed the operating copper loss will be satisfactorily low from an efficiency and heating standpoint. The ratio of leakage reactance to resistance of winding $a$ should be generally of the order of 1:2. It may be somewhat more or less than this ratio in certain designs depending upon the finally selected balance of the elements. In the winding $b$ the ratio of leakage reactance to resistance, taking into account the lesser number of turns and the consequent larger conductor sizes permissible, will be generally of the order of 2:1. While it may be somewhat more or less than this ratio, the important point is that the relative relationship of this ratio of leakage reactance to resistance be generally reversed as compared to the ratio existing in winding $a$. As the ratio of leakage reactance to resistance of the winding $b$ is contrary to the normal expectation in a winding of fewer turns or lesser number of slots, it is seen that the controlling factor lies in the arrangement of the primary slots to effect this reversed ratio. The slots B therefore are normally provided with a deep narrow slit 4 where the depth of the slit is many times greater than the width of the opening of the slit.

Figure 2A:
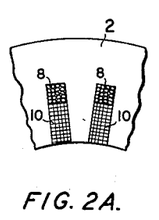
Figures 2A and 2B are fragmentary sectional views of a motor stator showing alternate types of coil slots.
Figure 2B:
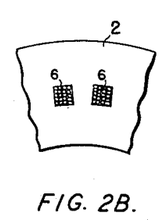

In order to avoid unexpected reversals or other undesirable saturation effects such as occur when starting currents are large as at stand-still when the reactance values cannot be maintained proportional the use of the deep slit, previously confined to secondary slot design, is most important to provide paths for the leakage flux. In fact, the failure of some of the structures disclosed in the prior art for the purpose of accomplishing self-starting of single phase motors resides in the fact that these structures do not make provision for the avoidance of such saturation effects. Therefore, the very deep tooth tips not heretofore found on stators due to the utility of them not having been understood are employed in the present motor. As mentioned previously, however, the resultant required ratios between primary windings may be obtained in other ways even in manners less easily controlled as, for example, fully closed slots 6 or the set down slots 9 shown in Figures 2A and B or otherwise, the important factor being the reversed relationship of the ratio of leakage reactance to resistance between the shallow bedded windings $a$ and the deep bedded windings $b$.

It should be observed that an essential of the present invention resides in making possible the use of the motor primary winding for the additional purpose of causing it to form an internal phase distributing device thus enabling the motor to become a self-starting machine.

The structure hereinbefore disclosed has been that of one pole of a two pole motor. If the phase angle adjusting feature is carried further than illustrated in Figure 1, it is possible to space the paralleled sections of the windings at angles from generally 0 to 180 electrical degrees. While such extremes of construction would produce somewhat inferior motors, it is quite possible to so construct motors which will operate particularly if adjustments of relative turns of the various windings are made to compensate for the particular angle selected.

The structure as drawn in the figures shows the motor primary windings carried by the stator. It is, of course, obvious that it is equally possible to have the primary windings carried by the rotor if, for reasons of application, such a construction becomes desirable.

An additional modification is that of employing more than two windings per pole. It is entirely practical to employ a greater number of windings having the proper relative values of resistance and impedance.

The secondary winding to be used with the above described primary winding may be a common single squirrel cage of the normal variety or any form of double squirrel cage, deep bar secondary or wound rotor arrangement.

In carrying out the details of this invention it is important to secure the proper balance of the elements involved. In Figure 3, which is drawn to indicate a complete four pole motor including a stator 2, a rotor 12 and squirrel cage rotor conductor bars 14, the spacing of the slots is selected on a uniform basis so that the space angles concerned can be selected and identified. Irregular spacing might be used if properly carried out but such a construction would produce a motor of less desirable characteristics than one in which the spacings were regular. Thus the two center lines CL1 and CL2 are established 180° apart or, in this case, 90 mechanical degrees apart and the winding bands $b_1$ and $a_2$ are located on these center lines so that a set of coils is centered on each. The $b_1$ coils, for example, are on the left and the $a_2$ coils are on the right. These bands of winding may occupy one or several slots as may be convenient for construction or design purposes. The reason for using this winding arrangement or its equivalent is to bring the $a_2$ and $b_1$ winding sections on separate poles of the motor so that the $a_2$ sections may be connected in parallel with the $b_1$ sections, these being circuits having generally inverse resistance and reactance as hereinbefore explained, and a further reason being to arrange that the counter-voltages generated in these circuits while the motor is running will be more nearly equal and more nearly in-phase to allow continuous connection in the circuit.

Sections $a_1$ and $b_2$ are located in one or more additional slots, the $a_1$ bands being ahead of the $b_1$ bands in space position while the $b_2$ bands are behind the $a_2$ bands, the rotation being selected as clockwise in this figure. Obviously by shifting the position of the $a_1$ and $b_2$ bands the reverse rotation will result. Four poles alternately north and south are established by the flux linkages as indicated.

Figure 4:
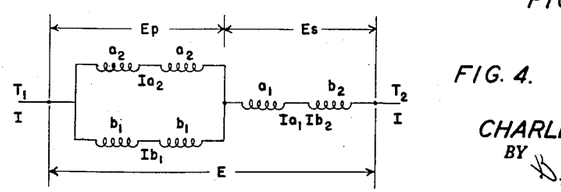
Figure 4 is a wiring connection diagram showing the connections between the coils indicated in Figure 3.

The winding bands are connected in series-parallel as shown in Figure 4. It is obvious, however, that other combinations of connections can be used provided the relative relationships required are maintained. For starting purposes it is essential that the currents in the $a$ coils reach their instantaneous maximums ahead of the occurrence of the maximum currents of the $b$ coils to give a sweeping flux action across the pole faces thereby establishing conditions for developing starting torque. It is also essential for proper running conditions after the motor has been started that circuits in parallel have very nearly equal and in-phase countervoltages set up by the rotor if circulating currents are to be minimized.

Figure 5:
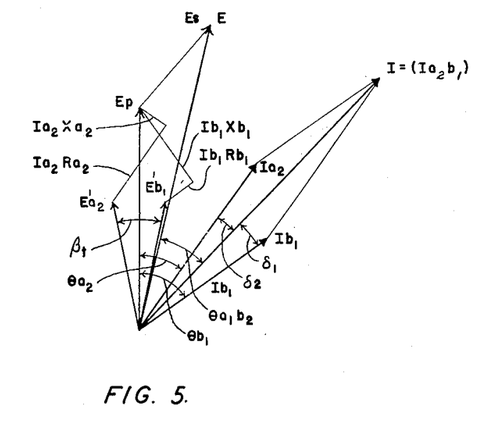
Figure 5 is a vector time diagram of voltages and currents existing in the wiring diagram of Figure 4 under starting conditions.

Figure 5 is a vector time diagram of the voltages and currents existing in the series-parallel connections shown in Figure 4 under starting conditions. It will be noted that the $I_a$ currents, that is both $I_{a1}$ and $I_{a2}$, lead in time and space the $I_{b1}$ and $I_{b2}$ currents provided the resistance and leakage reactance of the winding bands are properly established as has been previously explained.

These $a$ and $b$ current bands are located on the motor primary which may, of course, be either the stationary or rotating element of the motor, so that in each pole the flux sweeps across the pole face in the direction of desired starting rotation.

The angle between $I_{a2}$ and $I_{b2}$ is shown as a $\delta_2$, whereas the angle between $I_{a1}$ and $I_{b1}$ is $\delta_1$. As this diagram is a well known standard representation of a series-parallel circuit it requires no further explanation beyond pointing out that the applied voltage E has two components $E_p$ and $E_s$. $E_p$ is the voltage across the parallel branch and $E_s$ the voltage across the series branch. These voltages are at a phase angle depending upon the circuit factors as is usual. The primary power factor angles under the starting conditions are marked as $\theta$ with subscripts referring to the various currents involved. The rotor power factor angle, that is the angle between the induced rotor voltage and current, is not shown, but it is, of course, different from that of the primary as it is determined by the rotor factors. This angle is the same under both pole halves or sections.

Figure 6:
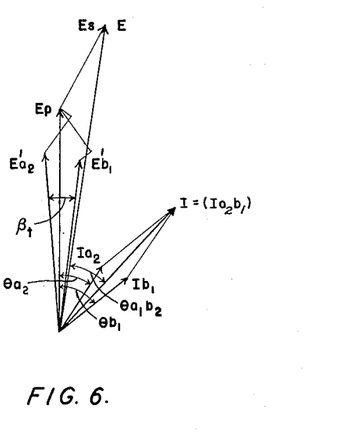
Figure 6 is a vector time diagram of certain voltages and currents existing in the wiring diagram of Figure 4 under running conditions.

When the motor is up to speed, that is at the end of the starting process, the factor of rotor developed countervoltage due to rotation is approximately at a maximum. Figure 6 is illustrative of this condition. It is to be seen that, whereas the external applied voltage on the parallel part of the circuit remains constant, the countervoltages developed in $a_2$ and $b_1$ are forced to be very slightly out of phase by the leakage reactance and resistance values. As these countervoltages $E'_a$ and $E'_b$ are developed in coils located on the machine at or nearly at identical phase positions and connected in additive fashion a slight circulating current is required to bring them into phase adjustment. In order to minimize the amount of this it is merely necessary to adjust the resistance and reactance factors relative to each other or to change the relative values of turns in the $a_2$ and $b_1$ sections of the winding in the direction such that balance results.

Figure 7:
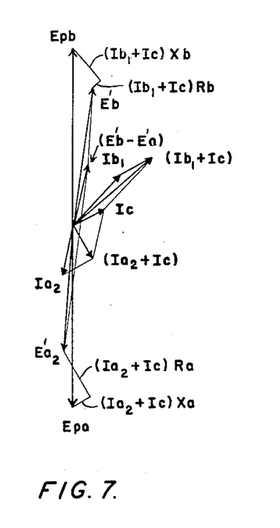
Figure 7 is a vector time diagram of the voltages and currents existing in the parallel circuits alone of Figure 6 showing the adjusting of the time displacement which takes place under running conditions.

The process is illustrated in Figure 7 with a diagram of the parallel circuit portion of Figure 4 redrawn to represent the current and voltage conditions with respect to each other. Hence, the two countervoltages $E'_b$ and $E'_a$ are shown in opposite directions representing the fact that each tends to send a current around the circuit in a direction in opposition to the other. Figure 7 exaggerates the conditions for the sake of clearness showing $E'_b$ greater than $E'_a$ hence the vector difference $E'_b - E'_a$ tends to send the current $I_c$ around the loop. Summing the corresponding applicable values the current in the $b_1$ leg becomes $I_{b1} + I_c$ and in the $a_2$ leg $I_{a2} + I_c$. These summations must consider proper phase relationships of the vector quantities involved. This adjustment is made in such a way as to reduce the current in the $a_2$ leg which has the greater resistance and usually the lesser section and to increase the current in the $b_1$ leg which has the lowest resistance and the greater capacity for carrying high current with the least heating. In a well balanced design the effect described is small, more especially as the current values with the motor at full speed are much reduced, as has been hereinbefore explained.

It is now plain that for proper arrangement of the invention the poles may be handled in pairs, or groups, thus all speed combinations above the two pole speed are accounted for.

Two pole motors, however, become a special case wherein the process is identical with the exception that the series leg of Figure 4 may be dropped out for one arrangement.

It will now be obvious to those skilled in the art that by properly combining reactance and leakage reactance and resistance values in accordance with this invention and interconnecting the resulting winding bands as taught herein to provide a starting distribution which later degenerates toward an in-phase condition for running, that a very useful self-starting single phase motor structure results. It is also apparent that the Figures 3, 4, 5, 6 and 7 are diagrammatical of the means employed to accomplish this result, and that other and more or less complicated circuits than that illustrated in Figure 4 may also be employed without deviating from the invention involved herein.

Placing the three branches of the winding arrangement of Fig. 4 in series connection would result in much weaker starting performance and would require the use of tapered resistance in the rotor winding to provide the proper variation across all pole faces. While such a motor could be made to operate, its performance would be inferior to that employing the more preferable arrangement.

It is also possible to connect the three branches in parallel and by providing proper turn adjustment the phase distributing action will provide starting torque. It will be noted that in Figure 3 the coil $b_2$ is retained in a deep slot. The only reason for this is to help control the total inrush current. The coil $b_2$ could equally well be placed in a shallow slot, as is the coil $a_1$. So far as phase is concerned, the $a_1$ coils are ahead of the pole axis of like polarity and by the same angle that the $b_2$ coils are behind it. This means that when the motor is up to speed the countervoltages generated in these turns can be made to be exactly in phase with the voltages of like character generated in the turns of $a_2$ and $b_1$. In addition, if $E_p$ is set equal to $E_s$ the branches may be placed in parallel. In the event that this is done, the factors of this $a_1$, $b_2$ branch must be adjusted to give the same relative position as that in Figure 5 with respect to $a_2$ and $b_1$. It will be readily understood that a three parallel connection for a four pole motor is entirely inconsistent with the practice found in the prior art, and the fact that such a motor will operate when constructed as disclosed herein is further evidence of the extreme novelty involved in this invention.

The teachings herein are new in that it has been previously practically universally taught that it is impossible to construct a motor of the single phase self-starting type employing a single continuously energized winding.

It is now obvious that a motor constructed in accordance with this invention utilizes a lesser number of coils than a motor constructed in accordance with previously known principles. In the present motor there is utilized one winding continuously energized, containing the full copper requirements for operation and also entirely capable of producing a positive reliable starting with adequate torque values. This great reduction in the number of coils required in the motor winding greatly reduces manufacturing costs while at the same time the motor retains its entire adequacy for service.

It will be recognized that in Figure 5 the two currents $I_a$ and $I_b$ under starting conditions are the inrush currents and consequently are of much greater magnitude to the normal operating currents, hence the accompanying $I_x$ and $I_r$ drops are much exaggerated over those of normal operation. It will be also noted that the relative values of $X_a$ and $R_a$, and $X_b$ and $R_b$ are of the required inversely proportional values hereinbefore reviewed. The flux of the motor under this condition is single in character and established as a stationary single phase field by the combined action of all the windings taken together. The vector diagram of Figure 5 is a time diagram and refers to the conditions in windings $a$ and $b$ as viewed from the motor terminals. A part of each of the various $I_a$ and $I_b$ currents is used in establishing the magnetic flux of the motor while the remainder is transferred to the rotor as in a short circuited transformer. As the motor resembles a short circuited transformer under this condition of voltage applied with motor rotor at standstill, the mutual flux and hence the magnetizing components mentioned will be quite small. For purposes of simplifying the explanation it will be assumed that the magnetizing components are negligible, thus the $I_a$ and $I_b$ currents may be considered as representing the secondary components. In an actual motor calculation this difference must be included but as can be readily appreciated for explanation purposes the extra complication of the diagram is not required.

It can be readily understood that, crossing to the secondary side of the motor there are the various $E_{as}$ and $E_{bs}$ voltages ($s$ signifying secondary), these being the various $E_a$ and $E_b$ primary values reduced by the standstill transformer ratio. Also each of these voltages is accompanied by its secondary current $I_{as}$ and $I_{bs}$, each of these being increased by the applicable transformer ratio. Each secondary current lags its voltage by an angle depending upon the ratio of the secondary resistance to impedance. The voltages are, however, out of time phase by the time angle $\beta_t$ existing between the primary voltage components as indicated in the vector diagram of Figure 5 or 8.

Assuming a simple two pole motor having winding as illustrated in Fig. 1 connected as shown in the parallel portion of Fig. 4. The power being transferred to the secondary from each winding acting as a transformer is therefore the product of voltage, current and power factor. Thus it is $E_{as}I_{as}\cos\theta_{as}$ for winding $a$ and $E_{bs}I_{bs}\cos\theta_{bs}$ for winding $b$ ($s$ signifying secondary). It should be noted that the rotor power factor angles change for each change in speed or during acceleration. Under starting conditions with large starting currents the reactance and resistance drops will be large and the angle $\beta_t$ will be comparatively large, whereas under running conditions the currents $I_a$ and $I_b$ become reduced in magnitude whereupon the resistance and reactance drops will be reduced and the voltages $E'_a$ and $E'_b$ in the diagram increase and draw together reducing the angle $\beta_t$ as the motor comes up to speed as shown in Fig 6. This means that the angle of distribution under running conditions is minimized. Thus the means for adjusting the internal phase angles of a single phase motor to give a phase distributing operation during the starting cycle and in-phase operation of the sections during running constitute an essential part of the invention. Thus, it can be seen that the problem of proportioning involved is to provide set starting conditions and at the same time arrange relationships to provide running conditions which are satisfactory.

In order to determine the starting performance use is made of the convention that single phase currents and voltages may be considered as being composed of equal half values which are rotating in opposite directions at a synchronous speed corresponding to the applied frequency. It is necessary to adopt this expedient at this point in order to bridge the transition from stationary pulsating effects to equivalent rotary values. Thus we have two secondary voltages not in time phase and two secondary currents not in time phase and each consisting of half components rotating in opposite directions. The torque developed will correspond to the combined effect of the forward components minus the combined effect of the backward components. In order to make this combination properly it is necessary to consider the space relationships of the $a$ and $b$ windings.

It is quite obvious that when all windings are carrying current both the stator and rotor are threaded by a common flux. The rotor voltages due to transformer action in accordance with this flux are out of phase with each other by the time angle $\beta_t$. Also they are out of phase in their space location on the machine by the angle $\beta_s$. In order to obtain a combined effect account must be taken of both time and space angles.

At the instant at which the voltage $E'_a$ induced in winding $a$ is a maximum the two components of half value $E_{af}$ (forward) and $E_{ab}$ (backward) are together in time and also together in space on the machine. Thus the induced voltage in winding $a$ is the arithmetical sum of its half components. At this same instant the induced voltage $E'_b$ in winding $b$ is less and $E'_b$ will reach its maximum later when its own components $E_{bf}$ and $E_{bb}$ come together. This happens at a time angle later than the occurrence of the maximum voltage value of $E'_a$. Hence the forward and backward half components of induced voltage in winding $b$ are represented in diagram of Figure 8 with each half component at the angle $\beta_t$ from maximum position with the directions of rotation as indicated so as to bring $E'_b$ to a maximum time $\beta_t$ degrees later than $E'_a$.

Figure 8:
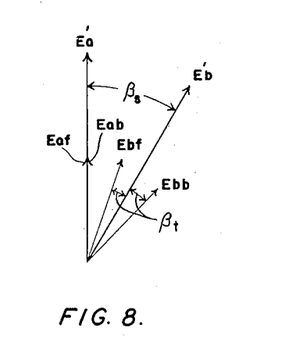
Figure 8 is a diagram showing forward and backward components of the voltages induced in the motor primary windings as are used for torque calculations.

Crossing to the secondary side, the induced voltages $E_{as}$ and $E_{bs}$ are thus located on the motor at the angle $\beta_s$ in space degrees. The flux, however, is a common flux. Adding these values, which have positions similar to the positions of $E'_a$ and $E'_b$ shown in Fig. 8, by use of the cosine law to determine the resultant forward and backward secondary circuit components gives the following:

$$E_{fs}=\sqrt{\left(\frac{\sqrt{2}E_{as}}{2}\right)^2+\left(\frac{\sqrt{2}E_{bs}}{2}\right)^2+\frac{2\sqrt{2}E_{as}\sqrt{2}E_{bs}}{2\times 2}\cos\beta_t}$$

$$E_{bs}=\sqrt{\left(\frac{\sqrt{2}E_{as}}{2}\right)^2+\left(\frac{\sqrt{2}E_{bs}}{2}\right)^2+\frac{2\sqrt{2}E_{as}\sqrt{2}E_{bs}}{2\times 2}\cos\beta_t}$$

In a similar way the total forward and backward currents are determined again establishing winding $a$ as the reference. Here, however, the mmfs. as represented by the currents do not combine at the same space angle as does the common flux, hence the space angle enters, this gives:

$$I_{fs}=\sqrt{\frac{I_{as}^2}{2}+\frac{I_{bs}^2}{2}+I_{as}I_{bs}\cos(\beta_s-\beta_t)}$$

$$I_{fs}=\sqrt{\frac{I_{as}^2}{2}+\frac{I_{bs}^2}{2}+I_{as}I_{bs}\cos(\beta_s+\beta_t)}$$

As the current in the rotor lags the voltage in the rotor by the power factor angle of the rotor circuit this effect must also be included. This gives:

Forward power $=E_{fs}I_{fs}\cos\theta_s=$ $$\sqrt{\frac{E_{as}^2}{2}+\frac{E_{bs}^2}{2}+E_{as}E_{bs}\cos\beta_t}\cdot$$

$$\sqrt{\frac{I_{as}^2}{2}+\frac{I_{bs}^2}{2}+I_{as}I_{bs}\cos(\beta_s-\beta_t)}\cdot\cos\theta_s$$

but $$\cos\theta_s=\frac{I_{fs}R_s}{E_{fs}}$$

Hence

Power forward =

$$\left[\frac{I_{as}^2}{2}+\frac{I_{bs}^2}{2}+I_{as}I_{bs}\cos(\beta_s-\beta_t)\right]R_s$$

In like manner

Power backward =

$$\left[\frac{I_{as}^2}{2}+\frac{I_{bs}^2}{2}+I_{as}I_{bs}\cos(\beta_s+\beta_t)\right]R_s$$

The net power in a forward direction available for torque is the difference between the forward power and backward power.

Power (for torque) =

$[I_{as}I_{bs}\cos(\beta_s-\beta_t)-I_{as}I_{bs}\cos(\beta_s+\beta_t)]R_s$

Power for torque $=I_{as}I_{bs}R_s[\cos(\beta_s-\beta_t)-\cos(\beta_s+\beta_t)]$ $=I_{as}I_{bs}R_s[2\sin\beta_s\sin\beta_t]$ Obtaining the torque in lb. ft. the usual conversion gives:

$$T=2I_{as}I_{bs}R_s\sin\beta_s\sin\beta_t\frac{7.03}{N}\text{ (lb. ft.)}$$

where N is the speed of operation in revolutions per minute.

This expression is in terms of secondary quantities. For convenience the equivalent primary quantities may be substituted by the use of applicable conversion factors as is often done.

The above torque values are, of course, the average values of resultant torque. The pulsating components require a little further analysis but such analysis is not necessary for an understanding of the present invention. Pulsating components of greater or lesser amounts are invariably present in single phase machines.

At first glance the average torque expression indicates the most favorable space angle or value of $\beta_s$ to be 90 electrical degrees (sin=1), however, it will be apparent that a shift in this angle to a value greater than 90 or less than 90 will affect the value as the sine of $\beta_s$ and advantage may be taken of this fact in assembling the structure.

Under starting condition of zero speed having a second winding at a selected space angle to a first winding and applying currents of different time phase to the two windings provides a resultant forward component of torque. This is the action of the normal split phase motor in starting. When the two windings are designed to have the reversed ratio of R to X with respect to each other, the time angle between the voltages of the two windings will diminish as the currents therein diminish from starting values to running values.

As the motor starts by the use of the hereinbefore described internal phase distributing arrangement the time angle between the various windings changes but the space angle remains fixed by the location of the coils. Under running conditions the motor operates as a plurality of single phase motors located in parallel on the same structure, dividing the load in the ratio of impedances and each winding supplying part of the necessary total magnetization to provide the single common rotary flux. The primary impedance ratios remain very nearly fixed with respect to each other, being established in a fixed frequency part of the circuit. This form of motor is therefore capable of being operated over a voltage range of from just above zero to somewhat over normal without encountering sudden reversals or other unexpected similar defects in operation such as are quite common in motors depending upon reluctance variations for basic operation.

It will be apparent that the two windings connected in parallel and having inverse ratios of resistance to reactance, as shown in connection with Figure 1 and as shown in the $E_p$ portion of Figure 4, constitute a basic element of this invention. This element may be used in conjunction with conventional coil windings, or the element may be used in conjunction with any number of similar elements by superimposing or by the procedure well known in the art called "cascading."

It will also be obvious that when reference is made in this specification to distribution of winding over pole faces, the meaning to be conveyed is that the winding is distributed over the pole faces on which the winding appears and is not to be limited as meaning that each winding is necessarily distributed over the face of each pole of the machine.

The invention, as disclosed herein, may also be applied to the single phase synchronous motor. The single phase synchronous motor is no more capable of starting itself than is the single phase induction machine, but inasmuch as its starting operation is that of partially imitating the induction machine it is clear that the present invention may be used to supply the starting feature for this type of motor.

It will be understood that it is not intended that this invention shall be limited by the above description and the accompanying drawings, since it will be appreciated that various modifications may be made therein without departing from the scope of the invention.

What I claim and desire to protect by Letters Patent is:

1. A self-starting single phase alternating current electric motor including a plurality of pairs of poles, a main running winding distributed over each of said pairs of poles and distributed over only a portion of each of the poles of at least one of said pairs of poles, and a starting winding having high leakage reactance with respect to said running winding, said starting winding being distributed over the portions of the poles not covered by said main running winding, said starting winding being in series connection and in mutually inductive relation with the portion of the running winding distributed over the same polar areas therewith, and being in parallel connection with a portion of the running winding distributed over other of said pairs of poles.

2. A self-starting single phase alternating current electric motor including a rotor member, a stator member and an air gap therebetween, one of said members containing a plurality of winding slots, and winding coils distributed in said slots defining polar areas, said coils including coils of a running winding and coils of a starting winding, the coils of the running winding being distributed in slots over each polar area and over only a portion of at least one pair of polar areas, the coils of the starting winding being distributed in slots over the portions of the polar areas not carrying coils of the running winding, the coils of the starting winding being in series connection with the coils of the running winding distributed over the same polar areas as the starting winding and being mutually inductive therewith, and the coils of the starting winding being in parallel connection with coils of the running winding distributed over other polar areas, the coils of the starting winding having high leakage reactance with respect to the coils of said running winding, said windings being distributed and having relative turn ratios such that the time phase differences between the currents in the starting and running windings will provide starting torque and that the countervoltages induced in the parallel pair of windings will approach a substantially inphase condition with respect to each other as the motor speed approaches normal operating speed.

3. A self-starting single phase alternating current electric motor including a rotor member, a stator member and an air gap therebetween, one of said members containing a plurality of winding slots, and winding coils distributed in said slots defining polar areas, said coils including coils of a running winding and coils of a starting winding, the coils of the running winding being distributed in slots over each polar area and over only a portion of at least one pair of polar areas, the coils of the starting winding being distributed in slots over the portions of the polar areas not carrying coils of the running winding, the coils of the starting winding being in series connection with the coils of the running winding distributed over the same polar areas as the starting winding and being mutually inductive therewith, and the coils of the starting winding being in parallel connection with coils of the running winding distributed over other polar areas, the coils of the running winding being distributed in conventional motor winding slots and lying substantially adjacent to the air gap between the stator member and the rotor member and having relatively low leakage reactance, and the coils of the starting winding being disposed in winding slots bedded deeply with respect to the slots carrying the running winding, the starting winding lying a substantial distance from the air gap and having relatively high leakage reactance, said windings being distributed and having relative turn ratios such that the time phase differences between the currents in the starting and running windings will provide starting torque and that the countervoltages induced in the parallel pair of windings will approach a substantially inphase condition with respect to each other as the motor speed approaches normal operating speed.

4. A self-starting single phase alternating current electric motor including a rotor member, a stator member and an air gap therebetween, one of said members containing a plurality of winding slots, and winding coils distributed in said slots defining polar areas, said coils including coils of a running winding and coils of a starting windings, the coils of the running winding being distributed in slots over each polar area and over only a portion of at least one pair of polar areas, the coils of the starting winding being distributed in slots only over the polar areas only partially covered by the starting winding, the coils of the starting winding being in series connection with the coils of the running winding distributed over the same polar areas as the starting winding and being mutually inductive therewith, and the coils of the starting winding being in parallel connection with coils of the running winding distributed over other polar areas, the coils of the running winding being distributed in conventional motor winding slots and lying substantially adjacent to the air gap between the stator member and the rotor member and having relatively low leakage reactance, and the coils of the starting winding being disposed in winding slots bedded deeply with respect to the slots carrying the running winding, the starting winding lying a substantial distance from the air gap and having relatively high leakage reactance, said windings being distributed and having relative turn ratios such that the time phase differences between the currents in the starting and running windings will provide starting torque and that the countervoltages induced in the parallel pair of windings will approach a substantially inphase condition with respect to each other as the motor speed approaches normal operating speed.

5. A self-starting single phase alternating current electric motor including a rotor and a stator, said stator containing a plurality of winding slots and winding coils disposed in said slots defining polar areas, said coils including coils of a pair of windings in parallel connection, the first of said pair of windings being distributed in slots over only part of each of a first pair of polar areas, the second of said pair of windings being distributed in slots over only part of each of a second pair of polar areas, the first of said pair of windings being disposed in conventional motor winding slots and lying substantially adjacent to the surface of the stator adjacent to the rotor and having relatively low leakage reactance, the second of said pair of windings being disposed in winding slots bedded deeply in the stator with respect to the slots carrying the first of said pair of windings, the second of said pair of windings lying with the entire winding in the deep slots being a substantial distance from said surface of the stator and having relatively high leakage reactance, said coils also including a winding in series with said parallel pair of windings and being distributed in slots over the part of each of said first and second pairs of polar areas not covered by either of said parallel pairs of windings, the windings extending over each of said polar areas being in mutually inductive relation, said windings being distributed and having relative turn ratios such that the time phase differences between currents in the parallel pair of windings during motor starting will provide starting torque and that the countervoltages induced in the parallel pair of windings will approach a substantially inphase condition with respect to each other as the motor speed approaches normal operating speed.

6. A self-starting single phase alternating current electric motor including a rotor and a stator, said stator containing a plurality of winding slots and winding coils disposed in said slots defining polar areas, said coils including coils of a pair of windings in parallel connection, the first of said pair of windings being distributed in slots over only part of each of a first pair of polar areas, the second of said pair of windings being distributed in slots over only part of each of a second pair of polar areas and having a lesser number of turns and a lower overall resistance than the first of said pair of windings, the first of said pair of windings being disposed in conventional motor winding slots and lying substantially adjacent to the surface of the stator adjacent to the rotor and having relatively low leakage reactance, the second of said pair of windings being disposed in winding slots bedded deeply in the stator with respect to the slots carrying the first of said pair of windings, the second of said pair of windings lying with the entire winding in the deep slots being a substantial distance from said surface of the stator and having relatively high leakage reactance, said coils also including a winding in series with said parallel pair of windings and being distributed in slots over the part of each of said first and second pairs of polar areas not covered by either of said parallel pairs of windings, the windings extending over each of said polar areas being in mutually inductive relation, said windings being distributed and having relative turn ratios such that the time phase differences between currents in the parallel pair of windings during motor starting will provide starting torque and that the countervoltages induced in the parallel pair of windings will approach a substantially inphase condition with respect to each other as the motor speed approaches normal operating speed.

7. A self-starting single phase alternating current electric motor including a rotor and a stator, said stator containing a plurality of winding slots and winding coils disposed in said slots defining polar areas, said coils including coils of a pair of windings in parallel connection, the first of said pair of windings being distributed in slots over only part of each of a first pair of polar areas, the second of said pair of windings being distributed in slots over only part of each of a second pair of polar areas, said coils also including coils of a pair of windings connected in series with said pair of windings in parallel connection, the first of said windings in series connection with the parallel pair of windings being distributed in slots over the part of the pair of polar areas not covered by the first of said pair of windings in parallel connection, the second of said windings in series connection with the parallel pair of windings being distributed in slots over part of the pair of polar areas not covered by the second of said pair of windings in parallel connection, the first of said pair of windings in parallel connection and the second of the pair of windings in series connection therewith being disposed in conventional motor winding slots and lying substantially adjacent to the surface of the stator adjacent to the rotor and having relatively low leakage reactance, and the second of said pair of windings in parallel connection and the first of the pair of windings in series connection therewith being disposed in winding slots bedded deeply in the stator with respect to said conventional winding slots and the windings lying with the entire winding in the deep slots being a substantial distance from the surface of the stator and having relatively high leakage reactance, the windings extending over each of said polar areas being in mutually inductive relation, said windings being distributed and having relative turn ratios such that the time phase differences between currents in the parallel pair of windings during motor starting will provide starting torque and that the countervoltages induced in the parallel pair of windings will approach a substantially inphase condition with respect to each other as the motor speed approaches normal operating speed.

8. A self-starting single phase alternating current electric motor including a rotor and a stator, said stator containing a plurality of winding slots and winding coils disposed in said slots defining polar areas, said coils including coils of a pair of windings in parallel connection, the first of said pair of windings being distributed in slots over only part of each of a first pair of polar areas, the second of said pair of windings being distributed in slots over only part of each of a second pair of polar areas, said coils also including coils of a pair of windings in series connection connected in series with said first pair of windings in parallel connection, the first of said windings in series connection with the parallel pair of windings being distributed in slots over the part of the pair of polar areas not covered by the first of said pair of windings in parallel connection, the second of said windings in series connection with the parallel pair of windings being distributed in slots over part of the pair of polar areas not covered by the second of said pair of windings in parallel connection, the first of said pair of windings in parallel connection and the second of the pair of windings in series connection therewith being distributed in conventional motor winding slots and lying substantially adjacent to the surface of the stator adjacent to the rotor and having relatively low leakage reactance, and the second of said pair of windings in parallel connection and the first of the pair of windings in series connection therewith being disposed in winding slots bedded deeply in the stator with respect to said conventional winding slots and the windings lying with the entire winding in the deep slots being a substantial distance from the surface of the stator and having relatively high leakage reactance, the windings extending over each of said polar areas being in mutually inductive relation, said windings being distributed and having relative turn ratios such that the time phase differences between currents in the parallel pair of windings during motor starting will provide starting torque and that the countervoltages induced in the parallel pair of windings will approach a substantially inphase condition with respect to each other as the motor speed approaches normal operating speed.

CHARLES C. HUTCHINS.

References Cited in the file of this patent

UNITED STATES PATENTS

| Number | Name | Date |
|---|---|---|
| 416,193 | Tesla | Dec. 3, 1889 |
| 598,092 | Heyland | Feb. 1, 1898 |
| 924,725 | Bergman | June 15, 1909 |
| 1,758,191 | Dom | May 13, 1930 |
| 2,219,702 | Schurch | Oct. 29, 1940 |
| 2,479,329 | Ellis | Oct. 16, 1949 |

FOREIGN PATENTS

| Number | Country | Date |
|---|---|---|
| 379,092 | Italy | Mar. 11, 1940 |